United States Patent [19]

Ocvirk et al.

[11] Patent Number: 5,195,810
[45] Date of Patent: Mar. 23, 1993

[54] ANTI-LOCK HYDRAULIC BRAKE SYSTEM

[75] Inventors: Norbert Ocvirk, Offenbach; Lutz Weise, Mainz, Fed. Rep. of Germany; James Remfrey, Oberursel, all of Fed. Rep. of Germany

[73] Assignee: Alfred Teves GmbH, Frankfurt Am Main, Fed. Rep. of Germany

[21] Appl. No.: 832,517

[22] Filed: Feb. 7, 1992

[30] Foreign Application Priority Data

Feb. 11, 1991 [DE] Fed. Rep. of Germany .... P4104068

[51] Int. Cl.$^5$ ............................................. B60T 13/14
[52] U.S. Cl. ................... 303/116 SP; 303/87; 303/11; 303/DIG. 5
[58] Field of Search ............. 303/10, 11, 87, 110, 303/113 R, 113 TR, 113 SS, 115 R, 115 PP, 116 R, 116 SP, 119 R, DIG. 1, DIG. 2, DIG. 5

[56] References Cited

U.S. PATENT DOCUMENTS

| 4,844,558 | 7/1989 | Ishii et al. | 303/116 R |
| 4,892,364 | 1/1990 | Burgdorf | 303/116 R |
| 4,919,495 | 4/1990 | Kircher et al. | 303/113 R |
| 5,013,097 | 5/1991 | Gutzeit et al. | 303/116 R |
| 5,058,961 | 10/1991 | Mergenthaler et al. | 303/87 X |

FOREIGN PATENT DOCUMENTS

| 3740690 | 6/1989 | Fed. Rep. of Germany | 303/116 SP |
| 3834539 | 4/1990 | Fed. Rep. of Germany | 303/87 |
| 2214250 | 8/1989 | United Kingdom | 303/116 SP |
| 2230067 | 10/1990 | United Kingdom | 303/113 TR |
| 22422459 | 9/1991 | United Kingdom | 303/113 TR |
| 2244107 | 11/1991 | United Kingdom | 303/116 SP |

Primary Examiner—Douglas C. Butler
Assistant Examiner—Alfred Muratori
Attorney, Agent, or Firm—Robert P. Seitter; J. Gordon Lewis

[57] ABSTRACT

An anti-lock hydraulic brake system is described having a bypass line to a pump used to evacuate and pressurize the wheel brakes during antilock control. A pressure control valve in the bypass line regulates the pressure in the pressure line to the master cylinder pressure level. A low pressure accumulator absorbs recirculated fluid flow from the bypass line. A pressure operated valve opens only when a difference in pressure between the master cylinder pressure and the pump outlet pressure line pressure develops. The consequence is that a non-return valve a and pressure operated valve in combination bring about isolation of the master cylinder during antilock control to prevent brake pedal reaction to pump pressure developed during a braking pressure control operation. When the accumulator is fully charged, the bypass line is closed by means of a shut-off valve operated by an accumulator piston so that the pump delivers fluid via the pressure valve (18) back into the master cylinder (1).

4 Claims, 1 Drawing Sheet

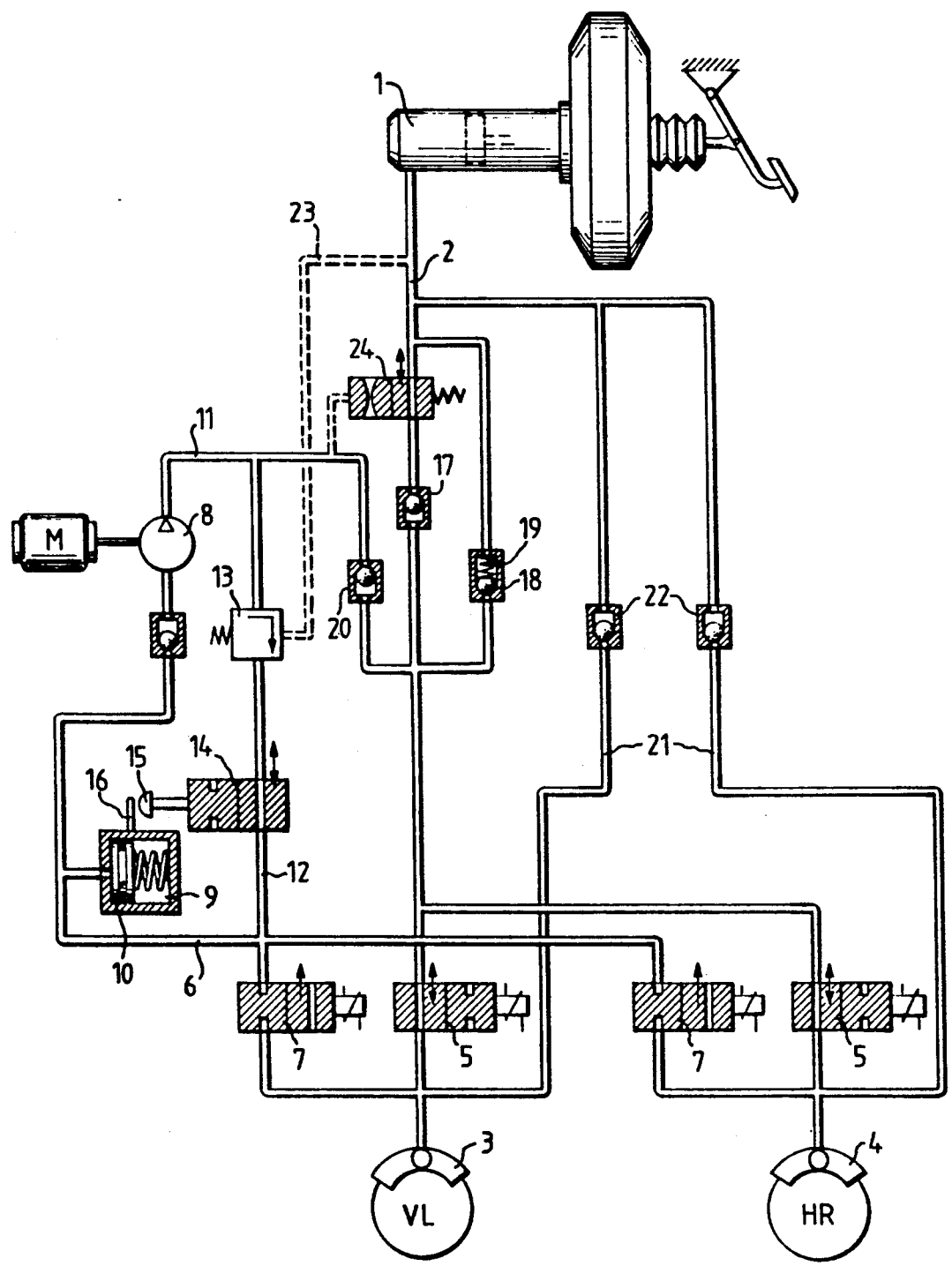

ANTI-LOCK HYDRAULIC BRAKE SYSTEM

BACKGROUND OF THE INVENTION

The present invention relates to an anti-lock hydraulic brake system, i.e. a brake system by virtue of which the brake slip of a wheel can be adjusted to an optimal value during a braking operation, locking. More particularly, the present invention is related to an anti-lock brake system operating according to the "return-delivery" principle.

A brake system operating according to the return delivery principle is described in German published patent application 35 41 742. As soon as a decrease of the wheel braking pressure becomes necessary, the brake line is closed and a return line to a pump opened, which now delivers fluid from the wheel brake back into the master brake cylinder. The return line is closed and the brake line opened again for renewed pressure build-up so that fluid flows from the master brake cylinder back into the wheel brake under the effect of pedal force. It is a disadvantageous in such brakes that a driver sensed pedal movement occurs during operation of the anti-lock control. Therefore, suggestions have already been made to isolate the pump circuit from the brake cylinder and to insert a separating valve into the brake line. Use of a separating valve makes necessary a high-pressure accumulator which receives the fluid delivered by the pump. Such accumulators are usually very large and hence result in a voluminous brake unit.

Further, brake systems according to the so-termed "open-loop" system are known (e.g. German published patent application 35 05 410). The fluid is discharged out of the wheel brake into an open supply reservoir in the open-loop systems. The pump constantly delivers fluid out of the supply reservoir back into the brake circuit during a braking pressure control operation. A braking pressure control valve is operated by the master cylinder pressure which is isolated from the brake circuit by means of a separating valve and which determines the pump pressure. Fluid, which cannot get into the brake circuit will be supplied via the pressure control valve back into the supply reservoir. Such systems have the disadvantage that fluid in the brake circuit escapes through the separating valve to discharge when the pump fails. Failure of the brake circuit thus occurs.

The present invention therefore has as an object to provide a brake system which operates reliably, has no reaction or only very little reaction to the master cylinder during control operation, and which is of a compact design.

SUMMARY OF THE INVENTION

According to the invention, a pump is provided having a suction side connected to a return line from the wheel brakes via an outlet valve. A bypass line is provided leading from the pressure line at the pump outlet to the pump suction, with a pressure control valve whose opening pressure is controlled by the master cylinder pressure inserted in the bypass line. A pressure level is thereby set in the pressure line which is not able to open a pressure operated valve in a parallel line to the brake line connecting the master cylinder to the wheel brakes. The master cylinder is thereby isolated from the wheel brake when the pump is operated.

The bypass line does not lead to an open reservoir but to a low-pressure accumulator with a limited absorptive volume receiving the bypassed pump flow. As the low-pressure accumulator is not able to absorb further fluid flow after being fully charged, no further pressure reduction in the wheel brake would be possible. Therefore a shut-off valve is provided in the bypass line which is operated by the low-pressure accumulator and shuts off the bypass line as soon as the low-pressure accumulator has reached a specific degree of charging. While this results in a pressure rise in the pressure line and opening of a pressure operated valve allowing communication of pump pressure to the master cylinder, this situation takes place only under very specific road conditions (widely varying friction ratios) which are of a very rare occurrence. A "vibration-free pedal" will hence ensue during a brake force control operation in the majority of cases.

As a closed-loop system is provided, the brake system cannot be discharged. The use of the pressure control valve results in there being no need for a high-pressure accumulator. A "vibration-free pedal" is obtained by the non-return valve in combination with the pressure valve which is conformed to the opening pressure of the pressure control valve.

DESCRIPTION OF THE DRAWING

The FIGURE is a diagram of a brake system according to the present invention.

DETAILED DESCRIPTION

The brake system is composed of a master cylinder 1 which is connected via a brake line 2 with wheel brakes 3 and 4. Hence the brake lines form branches, one inlet valve 5 being provided in each branch line. Each inlet valve 5 has an open position and a closed position and is operated electromagnetically. Normally it is in its open position. Complete isolation of the brake line is arranged for the closed position in the embodiment. However, it is also possible that the inlet valve merely throttles the brake line in the closed position to a major extent.

The wheel brake 3 communicates with the suction side of a pump 8 via a return line 6 into which an outlet valve 7 is inserted. The outlet valve 7 has a closed position and an open position and is likewise operated electromagnetically. Normally it is in its closed position. Further, a low-pressure accumulator 9 having a spring-loaded piston 10 connects to the suction side of the pump 8. The accumulator spring need only generate a small bias force in order to be able to generate a supply pressure for the pump 8.

The pump 8 is connected on its pressure side to the brake line 2, via a pressure line 11, the junction being disposed upstream of the inlet valve 5.

A bypass line 12 is provided in parallel to the pump 8 and connects the pressure side of the pump with the suction side. A pressure control valve 13 and a shut-off valve 14 are serially connected in the bypass line 12. The pressure control valve 13 is driven by a control line 23, the control line 23 terminating at the master cylinder 1. The pressure in the control line 23 determines the opening pressure of the pressure control valve 13 so that the pressure in the pressure line 11 corresponds substantially to the master cylinder pressure.

The shut-off valve 14 has two switched positions, namely an open position and a closed position. It is operated mechanically by means of a tappet 15, the tappet 15 cooperating with a pin 16 which is fixed to the piston 10 of the low-pressure accumulator 9. The shut-off valve 14 is normally open. When the piston 10 is displaced upon filling of the low-pressure accumulator, it will move to abut on the tappet 15 of the shut-off valve 14 at a defined charging degree and causes the shut-off valve 14 to assume its closed position.

A line closing means arrangement in the form of a separating valve means is included in the brake line between the master cylinder 1 and the inlet valve 5. The separating valve means is comprised of a non-return valve 17 in the brake line 2, which closes towards the master cylinder 1, and of a pressure valve 18 which is connected in a line parallel to the brake line in which the non-return valve is located. The pressure valve 18 opens towards the master cylinder.

To avoid allowing the pedal to be depressed through its full travel in the event of pressure reduction in the wheel cylinders by operation of the pump 8, a controllable throttle 24 can be mounted additionally upstream of the valve 17. It can be controlled by virtue of the pump pressure.

The valve member of the pressure valve 18 is loaded by a spring 19 which has as an effect that the pressure valve opens only if the pressure in the brake line downstream of the pressure valve is in excess of the pressure in the master cylinder by a defined amount. It must be stated herein that the pressure line 11 terminates into the brake line between the non-return valve 17 and the inlet valve 5. A safety valve 20 designed as a non-return valve and closing towards the pump 8 is still provided between the point where the bypass line branches from the pressure line and the junction of the pressure line into the brake line.

To complete the valve switching arrangement, a relief line 21 is provided for each wheel brake which connects the respective wheel brake directly with the master cylinder 1. Inserted into each relief line is a relief valve comprised of a one way or non-return valve 22, which each open towards the master cylinder 1.

It is important for the functioning of the system that the opening pressure of the pressure control valve 13 be in correspondence with that of the pressure valve 18. The pressure in the pressure line 11 which is adjusted by the master cylinder pressure by way of the pressure control valve 13 should not be allowed to become high enough to be able to overcome the adjusted difference in pressure on the pressure valve 18.

The system described operates as follows:

NORMAL BRAKING OPERATION

Operation of the master cylinder brings about a pressure build-up in the brake system composed of the brake line 2 and the wheel brakes 3 and 4. Fluid displaces from the master cylinder via the non-return valve 17 to the wheel brakes 3 and 4. This is possible because the inlet valves 5 are open and the outlet valves 7 are closed. Once the pedal is released, fluid flows out of the wheel brakes 3, 4 via the relief line 21 and the relief valves 22 back into the master cylinder 1. The pump system is not active during a normal braking operation.

ANTI-LOCK MODE

When it is detected during a braking operation that any one of the wheels tends to lock, the system switches to the anti-lock mode.

As is well known, this imminent locked condition can be detected by wheel sensors constantly monitoring the rotational behavior of the wheels, with the sensor signals being evaluated by suitable well known control electronics which can produce switching signals for the inlet valves and outlet valves and for the pump drive. To achieve a pressure reduction in a wheel brake, the respective inlet valve 5 will be closed and the associated outlet valve 7 will be opened. Fluid flows into the low-pressure accumulator 9 and is drawn from there by the pump 8 into the pressure line 11. As long as the inlet valve 5 is still closed, fluid flows via the pressure control valve 13 and the open shut-off valve 14 back into the low-pressure accumulator. Reverse pumping of the fluid is effected. The pressure in the pressure line 11 and thus in the brake line between the non-return valve and the inlet valve corresponds to the master cylinder pressure. When the inlet valve 5 is opened (and the outlet valve 7 is closed) the pump returns fluid into the wheel brake 3,4. Since the pressure in the pressure line 11 corresponds to the master cylinder pressure, the pressure valve 18 is not opened so that no fluid gets into the master cylinder.

The case may now occur (in particular when the tires move from a road surface of high friction to a road surface of lower friction) that a larger quantity of fluid is supplied into the low-pressure accumulator. The low-pressure accumulator piston 10 actuates via the pin 16 and the tappet 15 the shut-off valve 14 so as to close the bypass line 12. This eliminates the effect of the pressure control valve 13 so that the pressure in the pressure line 11 rises and increases so far that the adjusted difference in pressure on the pressure control valve is overcome, whereby fluid flows into the master cylinder. Therefore, a certain pedal feel reaction to the master cylinder cannot be avoided in the case described hereinabove.

In both cases the pressure in the wheel brakes 3, 4 can be set by successively switching the inlet and outlet valves 5 and 7 such that it corresponds to the respective road conditions so that the wheels run in an optimal slip range.

With modification, the system can also be used easily for controlling traction slip. For this purpose, the difference in pressure on the pressure valve 18 is adjusted so that, even when the master cylinder is unpressurized, a sufficient pressure level can be built up ahead of the pressure valve which suffices to brake the wheels and to compensate an excessive torque. Furthermore, an additional line must be provided which connects the suction side of the pump 8 directly with a supply reservoir so that the pump can suck in pressure medium for filling the brake lines. The relief line of the wheel to be driven be furnished with a shut-off valve, too, in order to prevent pressure reduction via the respective relief valve during a traction slip control operation.

We claim:

1. An anti-lock hydraulic brake system comprising:
a brake circuit and a closed pump circuit, said brake circuit including a master cylinder and a wheel brake and a connecting brake line, an electromagnetically operated inlet valve in said brake line;
said pump circuit having a suction side, a return line communicating with said brake line between said inlet valve and said wheel brake, a pump having a pressure side, a pressure line communicating said pump pressure side with said brake line at a junction located between said master cylinder and said inlet valve, a pressure control valve controlled by the pressure developed by said master cylinder, a bypass line interconnecting said pressure side and suction side of said pump, said pressure control valve in said bypass line, a low-pressure accumulator which can be charged to varying degrees and is connected to said suction side of said pump, a shut-off valve in said bypass line, means operating said shut off valve in dependence on the charging degree of said low-pressure accumulator, whereby said bypass line is closed when said low-pressure accumulator is fully charged, separating valve means in said brake line between said junction of said pressure line therewith and said master cylinder said separating valve means comprising a non-return valve in said brake line which closes towards said master cylinder, and a pressure opening valve arranged in parallel to said non-return valve and which opens towards said master cylinder at a defined difference in pressure thereacross, said difference in pressure being at a level such that at an opening pressure of said pressure control valve said pressure opening valve is not able to open.

2. A brake system as claimed in claim 1, wherein an electromagnetically operated outlet valve is in said return line and is opened during operation of antilock control of said system.

3. A brake system as claimed in claim 1 wherein said low-pressure accumulator includes a housing, and a piston movable in said housing to charge said accumulator, a pin moved by said piston, a tappet on said shut-off valve (14), said pin engaging said tappet to operate said shut off valve when said accumulator becomes fully charged.

4. A brake system as claimed in claim 1, further including a throttle valve in said brake line switchable from an open position to a throttled position, and means causing said switching at the beginning of an antilock control operation.

* * * * *